United States Patent [19]
Stella et al.

[11] 4,139,284
[45] Feb. 13, 1979

[54] FILM PROCESSING CASSETTE CONTAINING MEANS FOR ABSORBING EXCESS FILM PROCESSING FLUID

[75] Inventors: Joseph A. Stella, Peabody, Mass.; Frank W. Knight, Salem, N.H.

[73] Assignee: Polaroid Corporation, Cambridge, Mass.

[21] Appl. No.: 791,026

[22] Filed: Apr. 26, 1977

[51] Int. Cl.² ............................................. G03C 11/00
[52] U.S. Cl. .................................... 352/130; 354/304; 354/317
[58] Field of Search ............. 352/130, 78 R; 354/304, 354/317

[56] References Cited

U.S. PATENT DOCUMENTS

| 3,868,716 | 2/1975 | Lippert et al. | 354/317 |
| 4,042,396 | 8/1977 | Sylvester | 354/304 |

Primary Examiner—Monroe H. Hayes
Attorney, Agent, or Firm—David R. Thornton; Frederick Goettel, Jr.

[57] ABSTRACT

A photographic system for processing and viewing film contained in a cassette with a processor for applying processing fluid to the film strip having valve means to seal the processor at the conclusion of fluid application. An absorbing pad is positioned on the film strip to absorb any excess fluid deposited on the film prior to complete sealing of the applicator system.

3 Claims, 10 Drawing Figures

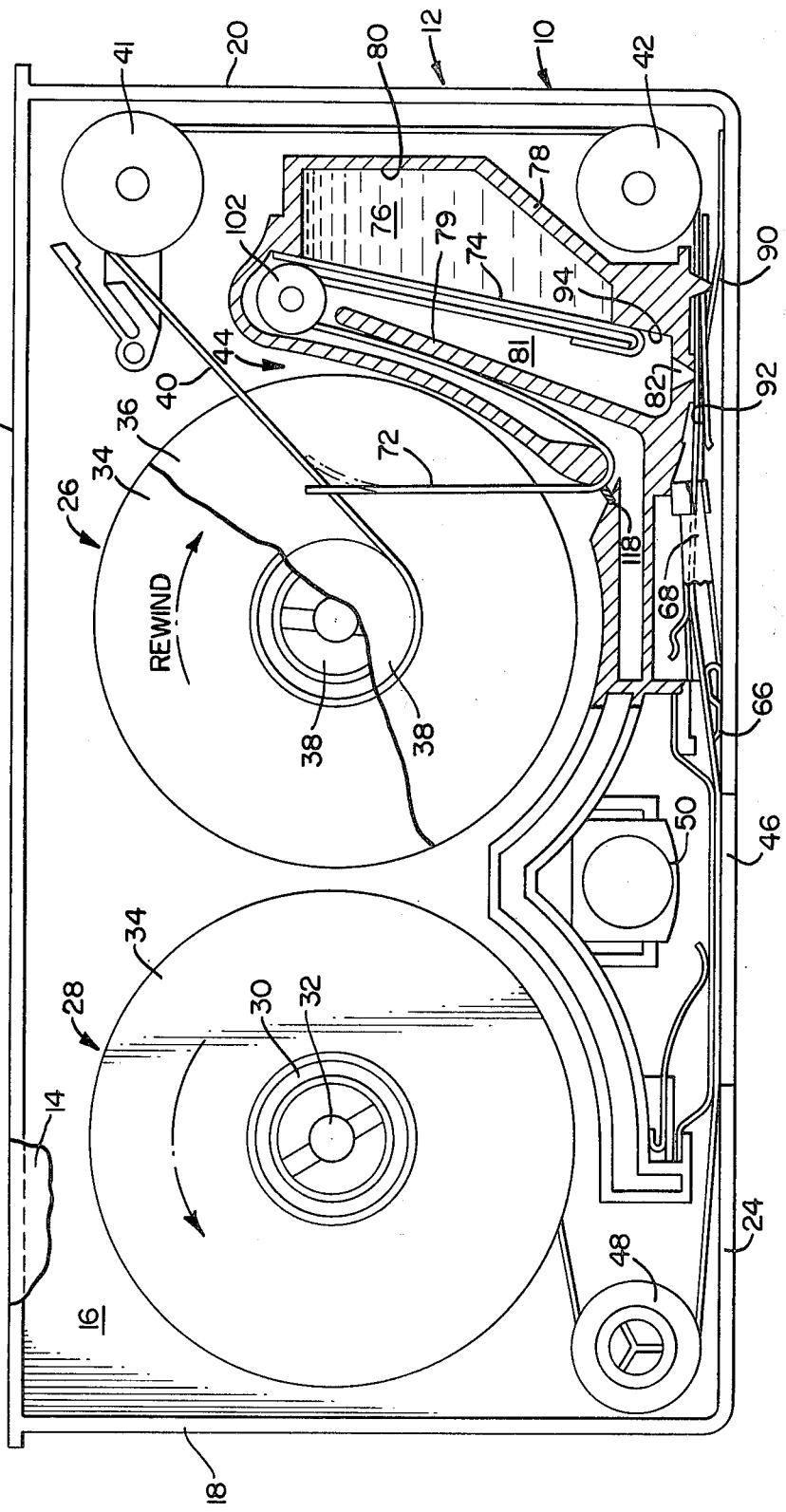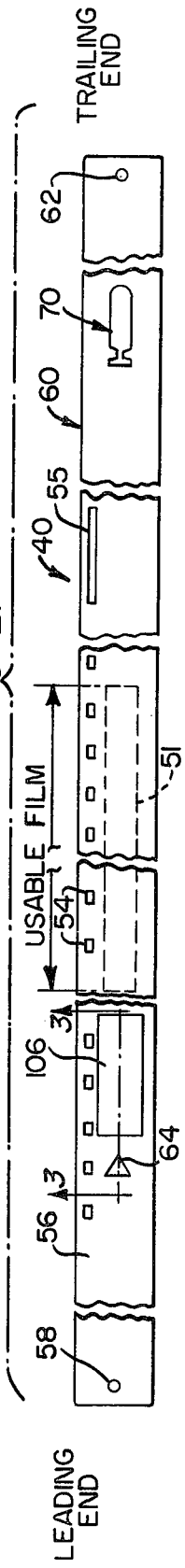

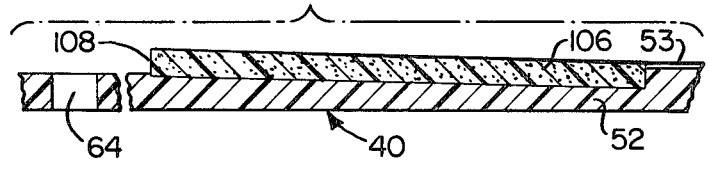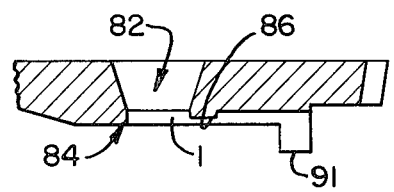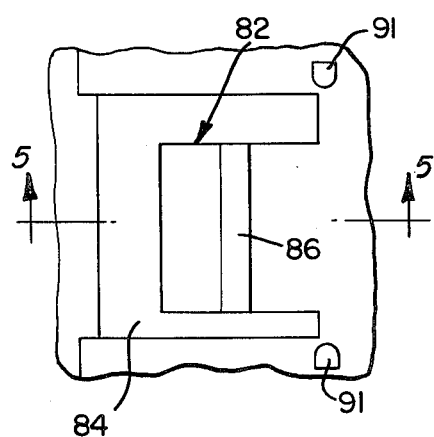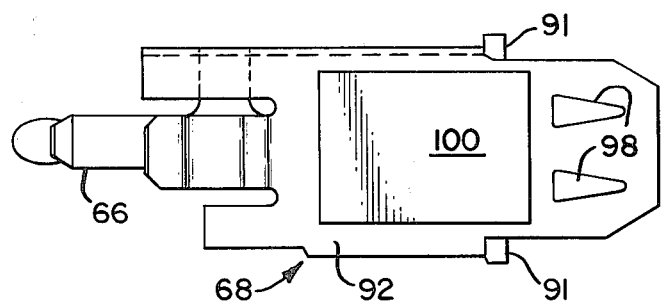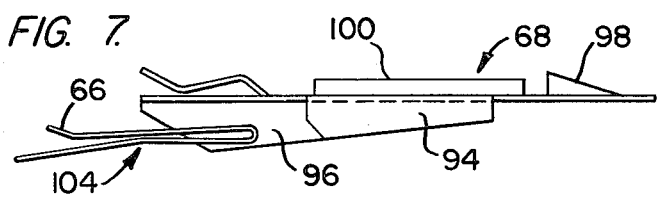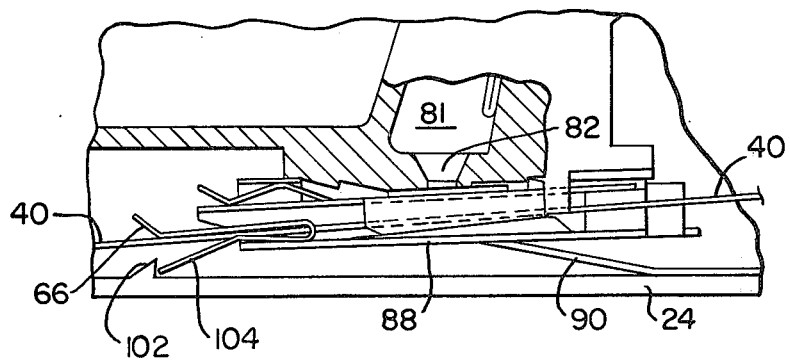

FILM PROCESSING CASSETTE CONTAINING MEANS FOR ABSORBING EXCESS FILM PROCESSING FLUID

BACKGROUND OF THE INVENTION

This invention relates to multi-purpose photographic film cassettes of the type in which a film strip is initially packaged for retention without removal during exposure, processing and projection operations. More particularly, it concerns a novel organization for absorbing residual processing fluid applied to the film strip during rewind through an applicator nozzle sealed or closed at the termination of film strip processing.

Cinematographic systems employing a multi-purpose film cassette containing a photographic film strip together with a supply of processing fluid so that the film strip may be exposed in a camera and subsequently processed and projected in an appropriate viewing apparatus exclusively by manipulation of the cassette alone are the subject of several pending and issued U.S. patents commonly assigned to the assignee of the present invention. A recent development of the viewing apparatus for such systems is exemplified by a copending application, Ser. No. 756,542, filed by Herbert L. Hardy on Jan. 3, 1977. In such systems, after the film strip is exposed by mounting the cassette in a motion picture camera, the cassette is inserted into an automatic viewing apparatus capable of discerning the processed or unprocessed condition of the film strip and in the latter case, initiating a processing mode of operation. During processing, the viewing apparatus operates to rewind the film strip from a cassette contained take-up spool back to a supply spool under a processing fluid applicator having a nozzle through which processing fluid flows by gravity and is spread evenly over the emulsion side of the film strip. At the end of processing, a cassette contained valve member is moved to a position closing the processing fluid nozzle to prevent further discharge of any residual processing fluid from the applicator.

The problem of handling residual fluid in the above-noted applicator has been recognized and dealt with in such prior disclosures as those of U.S. Pat. No. 3,806,237 issued Apr. 23, 1974 to Edwin H. Land; U.S. Pat. No. 3,868,716 issued Feb. 25, 1975 to Irving S. Lippert and Joseph A. Stella; and U.S. Pat. No. 3,882,526 issued May 6, 1975 to Irving S. Lippert and Joseph A. Stella, each such patents being commonly assigned with the present invention. In U.S. Pat. No. 3,882,526, for example, the processor is internally fitted with a time delay, absorbent sponge or foam to be exposed within the pod or reservoir of processing fluid to retain any residual amounts of such fluid after processing. In U.S. Pat. No. 3,868,716, a pad of sealant material is also provided on the valve member and carried by the latter to the nozzle of the processor at the termination of the processing operation to seal the nozzle against passage of any residual processing fluid.

Additionally, an arrangement for repeatedly cleaning film engaging components has been disclosed in the commonly assigned U.S. Pat. No. 3,806,237 wherein a cleaning pad carried by the film strip is advanced across critical components of the viewer during each projection cycle of the viewer apparatus.

While the above-noted systems are quite satisfactory for viewer apparatus where the fluid deposit is uniform, further difficulty arises in systems such as described in the aforementioned application Ser. No. 756,542 wherein the film speed is slowed down at the end of processing. In the latter case, since the aforementioned slide valve is picked up and closed by the slowly moving film and also deflects a film support member away from the film, thereby allowing slight displacement of the latter from the nozzle, a relatively large amount of fluid is deposited on the film at this time, thereby causing a fluid puddle. The fluid thus remaining as a puddle on the film will require an unacceptable drying time and be carried by the film strip as liquid in a manner to represent a potential source of cassette component fouling when the film strip is taken through a mandatory project cycle following the processing operation. Thus, enhanced overall system operation will result where complete disposition of all residual processing fluid is accounted for.

SUMMARY OF THE INVENTION

In accordance with the present invention, the takeup leader portion of the film strip contained within a multi-purpose cassette includes or carries an absorbent pad arranged to be positioned under the applicator nozzle of a cassette contained processor at the conclusion of processing fluid application to the film strip. As a slide-valve member is moved under the applicator nozzle for sealing the latter, the film mounted absorbent pad moves into a leading position located approximately beneath and adjacent to the valve member.

The absorption pad is formed of resilient, sponge-like polyvinyl chloride material and is preferably embossed into the film strip in a manner to provide a tapered outward surface. The tapered surface of the absorption pad converges in the direction of film movement during processing so that it presents no obstruction to such movement into a position where it absorbs any excess processing fluid on the film during closing of the valve member into its sealed position.

Consequently, an important object of this invention is to provide an improved multi-purpose film cassette processing system for applying processing fluid to a strip of exposed photographic material. Other objects include the provision of such a processing fluid applicator system having an improved, relatively inexpensive and extremely effective means for sealing and absorbing residual fluid at the end of film processing; to provide an absorption pad on the film strip which moves into position adjacent the nozzle area as the slide valve member is moved into its nozzle sealing position; the provision of such a pad which is shaped to provide little or no obstruction to film movement during processing; and to provide such an absorption pad on the film strip in a position to absorb any residual processing fluid remaining on the film strip after sealing the supply of fluid in the cassette.

Other objects and further scope of applicability will become apparent from the detailed description to follow taken in conjunction with the accompanying drawings in which like parts are designated by like numerals.

BRIEF DESCRIPTION OF THE DRAWINGS

FIG. 1 is an enlarged cutaway side elevation in partial cross-section illustrating the interior components of a multi-purpose film cassette incorporating the invention;

FIG. 2 is a fragmentary plan view illustrating the various portions of the film strip incorporated in the cassette;

FIG. 3 is an enlarged fragmentary cross-section taken on line 3—3 of FIG. 2.

FIG. 4 is a bottom plan view of a processing fluid applicator nozzle used in the cassette;

FIG. 5 is a fragmentary cross-section of the coating nozzle taken on line 5—5 of FIG. 4.

FIG. 6 is a plan view of a nozzle sealing member employed in the cassette;

FIG. 7 is a side elevation of the sealing member shown in FIG. 6;

FIG. 8 is a fragmentary cross-section of the processor system with the sealing member in its closed position; and is an enlarged view of a portion of the applicator system of FIG. 1.

DETAILED DESCRIPTION OF THE PREFERRED EMBODIMENT

Figure 9:
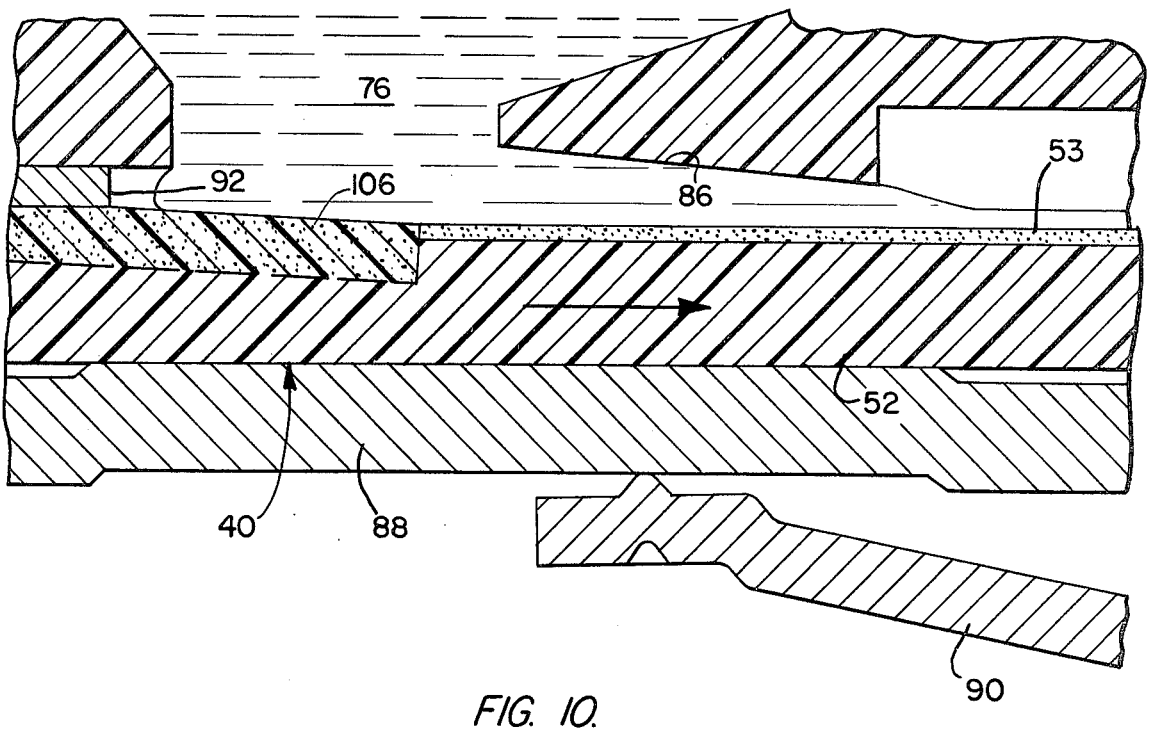
FIGS. 9 and 10 are vastly enlarged cross-sectional views showing the operation of the absorption pad of the invention at termination of film strip processing.

In the drawings, a multi-purpose cassette incorporating the present invention is generally designated by the reference numeral 10. Although many of the features of the cassette 10 are disclosed in the prior art and thus not novel with the present invention, some of the details of the cassette are relevant to a complete understanding of the improvement provided by the present invention. Thus, and as shown in FIG. 1, the cassette 10 includes a generally parallelepiped casing or housing 12 established by planar faces or side walls 14 and 16, end walls 18 and 20 and elongated top and bottom edge walls 22 and 24, respectively. A pair of spools respectively designated hereinafter as a supply spool 26 and a take-up spool 28 are supported rotatably in the housing by annular, light-tight bearings 30 on the spools engaged by complementing ring-like embossments (not shown) on the interior of the side walls 14 and 16. Also each spool is provided with a drive socket 32 for engagement by appropriate drive shafts in either of the camera (not shown) or the viewing apparatus (not shown) with which the cassette is used in accordance with the overall system described in the prior referenced above cited. Each of the spools 26 and 28 is provided further with a pair of opposed flanges 34 and 36 affixed to opposite ends of central hubs 38 to which opposite ends of a film strip 40 are permanently connected. Although the film strip will be described in more detail below, it will be noted from FIG. 1 that the path of the film strip 40 in the housing 12 extends from the hub 38 of the supply spool 26 about guide rollers 41 and 42 across a normally inoperative film processing station 44, an opening 46 in the bottom edge wall 24, about a further guide roll 48 and to the take-up spool 28. The opening 46 functions at different times to facilitate both exposure and projection of the film strip 40, a prism 50 being located behind the film strip at the opening 46 to facilitate the latter operation.

Because the film strip 40 functions as an operating component in the cassette over and above its principal function of recording photographic images, reference is now made to FIG. 2 of the drawings in which the full length of the strip is illustrated. As shown, the film is provided with a major central portion 51 of useable film upon which projectable images may be formed. To this end, the film strip includes a carrier base 52 of any suitably strong transparent material carrying an emulsion 53 (FIG. 3) or photo-sensitive coating of any conventional variety; for example, an emulsion developed by a monobath processing composition to form a positive transparency suitable for projection. Also a series of uniformly spaced sprocket holes 54 are provided along the length of the film to facilitate incremental film advance during exposure and projection. An elongated sprocket hole 55 is provided in line with the holes 54 for the purpose of interrupting advance travel of the strip by the incremental drive mechanisms provided in the camera (not shown) and the viewing apparatus (not shown) with which the cassette is used.

At least the carrier base 52 of the strip extends beyond the end of the central portion of useable film 51 to provide at one end a leading end portion (take-up leader) 56 having an aperture 58 by which the take-up leader may be permanently affixed to the hub of the take-up spool 28. A trailing end portion (supply leader) 60 at the opposite end of the strip is similarly provided with an aperture 62 for permanent connection to the hub 38 of the supply spool 26. The film strip is provided in its take-up end 56 with a triangular aperture 64 which functions at the end of the processing cycle to engage a tongue 66 at one end of a valve member 68 at the end of the processing cycle.

Also as shown in FIG. 2, the supply leader 60 is provided with a discontinuity, preferably an aperture 70 of bottle-shaped configuration to engage a pull strip 72, shown in FIG. 1, at the initiation of processing rewinding travel of the film strip 40. The pull strip is attached to a tear strip closure 74 which initially seals a supply of processing fluid 76 but which is removed upon movement of the pull strip with the film strip.

With reference again to FIG. 1 of the drawings, it will be noted that the processing station 44 is formed in part by internal cassette transverse wall formations 78 and 79 defining in part a pair of chambers 80 and 81, the latter of which opens at its bottom to the processing fluid applicator nozzle 82 positioned to overlie the emulsion carrying surface of the film strip 40 as it passes between the cassette exposure-projection opening 46 and the guide roller 42.

The organization of components cooperable with the processing fluid applicator nozzle 82 to achieve the application of processing fluid to the emulsion side of the film strip 40 may be understood most clearly by reference to FIGS. 4-8 of the drawings. As shown in FIGS. 4 and 5, the nozzle 82 is formed as an integral molding of suitable synthetic resinous material providing an applicator surface having generally U-shaped land 84 lying in a single plane spaced slightly below a transverse doctoring blade surface 86. Support means comprising a pressure pad 88 (FIG. 8) supported by a leaf spring 90 from the bottom wall 24 of the cassette housing biases the film strip 40 upwardly against the planar U-shaped land 84 to space the film strip a selected distance from the doctoring surface 86 to thereby effect a controlled thickness of the deposited fluid.

The condition of the pressure pad 88 as well as the valve member 68 in relation to the nozzle 82 and the film strip 44 is essentially that as shown in FIG. 1 of the drawings at the initiation of a processing cycle. In this condition, the valve member 68 is displaced upstream, in the context of the direction of film strip rewind travel, from the nozzle 82 and the pressure pad 88. Thus, after an initial film strip rewinding movement to sufficient for the pull strip 72 to be drawn with the tear strip 74 to open the reservoir 80 and allow the processing fluid 76 to drain into the reservoir 81, continued rewind movement of the film strip 40 from the take-up spool 28 back to the supply spool 26 will result in the deposition of a uniform layer of processing fluid on the emulsion surface 53 of the film strip.

At the end of the processing operation, the tongue 66 on the valve member 78 will pass into the triangular aperture 64 on the film strip in a manner such that the valve member will be moved physically in the direction of film strip travel essentially to the position shown in FIG. 8 of the drawings. A pair of depending stop posts 91 on the nozzle 82 limit movement of the valve member to this position. It will be noted by reference to FIGS. 6 and 7 of the drawings that the valve member is formed of sheet metal to provide an upwardly facing, flat plate-like portion 92 spanning a pair of depending wedge members 94 and 96 which are located forwardly of the tongue 66 in terms of film strip rewind travel. The wedge members 94 and 96 straddle the film strip 40 and are tapered so as to engage and displace the pad 88 away from the nozzle 82. The plate 92 includes a pair of upstanding wedge-shaped cams 98 on its forward edge and further supports a pad of sealing material 100 on its upper surface. The sealing material is a compressed, open-cell foam material sauturated with a coagulated chemical all as described in U.S. Pat. No. 3,868,716 and functions to effect a sealing closure of the nozzle 82 at the termination of the processing cycle to prevent leakage of any residual processing fluid from the chambers 80 and 81.

Once the valve member 68 has moved to the position shown in FIG. 8, it is retained permanently in that position as a result of the wedge-shaped dimples 98 and also due to an upstanding wedge-shaped projection 102 positioned in the bottom wall 24 of the cassette to engage a downwardly and rearwardly inclined tang 104 formed as part of the valve member 68. As noted previously, the depending wedge-like members 94 and 96 function to cam the pressure pad 88 downwardly and away from the planar surface 84 of the nozzle 82 so that during subsequent operation of the cassette, as during projection and rewind cycles, the pad 88 will in no way obstruct free passage of the film strip 40 past the processor which is no longer necessary at that time. Hence, the members 94 and 96 provide means effective when the coating of the useable length of film is completed or that is, upon termination of processing for increasing the spacing between the nozzle 82 and the pressure pad 88 to allow free film travel.

Although the structure of the film strip 40 as well as the general organization of components in the cassette 10 as thus described above are similar to the disclosure of U.S. Pat. No. 3,868,716, it will be noted by reference to FIGS. 2, 3, 9 and 10 of the drawings that in accordance with the present invention, an absorption pad 106 is mounted on the leading end portion 56 of the film strip 40 in a position spaced slightly toward the trailing end of the film strip from the triangular aperture 64. The pad 106 is preferably formed of a strip of resilient, sponge-like polyvinyl chloride (PVC) material mounted on the emulsion side of the film strip under pressure alone or with a combination of pressure and ultrasonic vibration or heat so that the end of the pad facing the trailing of the film strip (as defined by the forward, exposure run) will be embossed or buried, preferably to a point where the upper surface 108 thereof lies flush with the upper surface of the emulsion layer 53. The end 108 of the strip 106 facing the leading end of the film strip or, that is, spaced most closely to the aperture 64 is preferably elevated above the level of the emulsion layer 53 to effect the approximate configuration illustrated in FIG. 3 of the drawings.

Figure 10:
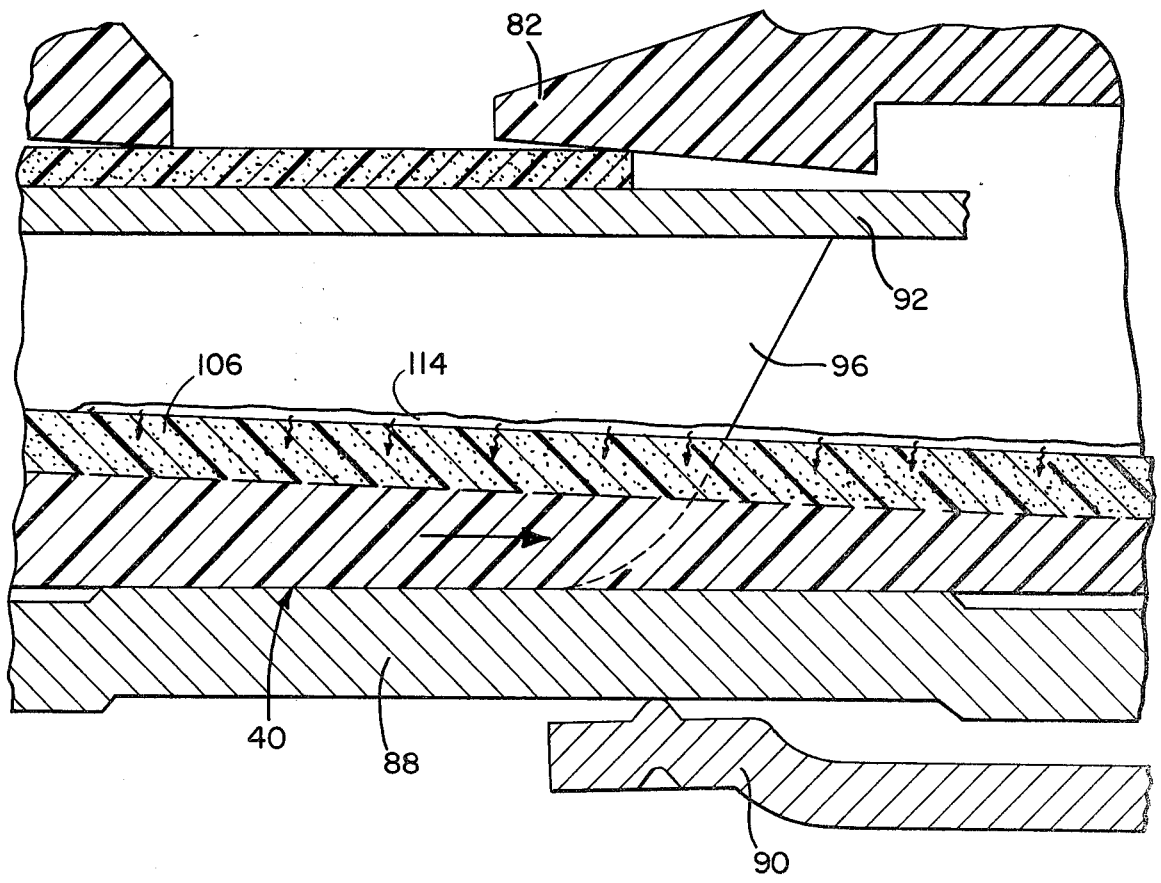

The function of the absorption pad 106 in the cassette 10 may be understood by reference particularly to FIGS. 9 and 10 of the drawings. As mentioned above, at the termination of film strip processing in which the film strip is being rewound in a direction toward the supply spool 26 or in the direction of the arrows superimposed on the carrier base in FIGS. 9 and 10, the tongue 66 of the valve member 68 becomes engaged in the triangular aperture 64 of the film strip 40 so that the valve member 68 will be advanced (or rewound) with the film strip 40 to its ultimate sealing position described above with respect to FIG. 8. It will be appreciated from the illustration in FIG. 9 that the processing fluid will be deposited as a uniform layer as designated at 112 on the emulsion 53 over the length of at least the useable film portion 51 as a result of continuous linear travelling movement of the film strip. The thickness of the fluid layer 112 is a function of the spacing between the doctoring surface 86 and the emulsion surface 53, and this spacing is determined to a large extent by the position of the pressure pad 88 in its film engaging position as shown in FIG. 9.

As the processing operation reaches termination, however, the duration of time required for the valve member 92 to move into a position depicted by FIG. 10 in which it seals the opening of the nozzle 82 in conjunction with the displacement of the pad 88 which allows the film 40 to fall away from the nozzle 82, permits a relatively large amount of fluid (as compared to the layer 112) to remain as a puddle 114 on the film strip which is quickly absorbed by the pad 106.

The deleterious effects of such a puddle of processing fluid may be appreciated when it is borne in mind that after a 30 second imbibition time following the end of processing, the system is programmed automatically in a mandatory project cycle to assure a complete drying of the processing fluid. During this mandatory project operation, the puddle of processing fluid will be drawn against various components of the cassette interior and impair operation during subsequent projection cycles.

As depicted in FIG. 10 of the drawings, the absorption pad 106 is positioned relative to the aperture 64 and hence to the engaged valve 92 so that as the valve member 92 moves to its sealing position, any excess processing fluid will overlie the pad and be absorbed therein. In this manner, both the formation and the deleterious effects of such excess residual processing fluid is alleviated. Preferably, the pad 106 extends for a sufficient length to both underly the sealing portion of the valve 92 and extend a short distance (see FIG. 9) beyond the leading edge thereof as viewed in the direction of valve travel.

Thus, it will be appreciated by this invention there is provided a highly effective organization for absorbing residual processing fluid applied to the film strip in a multi-purpose photographic film cassette of the type illustrated above and by which the above-mentioned objectives are completely fulfilled. It will be appreciated by those skilled in the art that various modifications and or changes may be made in the embodiment of the invention disclosed herein without departure from the inventive concept manifested thereby. Accordingly, it is expressly intended that the foregoing description is illustrative of a preferred embodiment only, not limiting, and that the true spirit and scope of the present invention be determined by reference to the appended claims.

What is claimed is:

1. In a multipurpose cassette containing a strip of photographic film configured to be exposed and treated with processing fluid, means when driven for advancing said film strip within said cassette, a processing fluid applicator for applying said processing fluid to a given length of said film strip to develop viewable images thereon, said applicator having an applicator surface in facing relation to said film strip, said applicator surface including means for depositing said processing fluid on said film strip, support means for initially supporting said film at a given distance from said applicator surface, so as to provide a processing fluid coating of predetermined thickness on said given length of said film strip during advancement thereof, and means operative when said coating has been deposited on said given length of said film strip for increasing said given distance between said applicator surface and said support means to thereby allow subsequent free travel of said film strip therebetween, said increase of said given distance allowing deposit of an excess of processing fluid on said film strip, the improvement comprising:

absorption means carried by said film strip for absorbing said excess fluid deposited on said film strip when said spacing is increased, said absorption means comprising a pad of absorbent material secured to said film strip and having its leading end, as viewed with respect to film strip advancement during deposit of said processing fluid, pressed into the surface of said film strip.

2. In a multipurpose cassette containing a strip of photographic film configured to be exposed and treated with processing fluid, means when driven for advancing said film strip within said cassette, a processing fluid applicator for applying said processing fluid to a given length of said film strip to develop viewable images thereon, said applicator having an applicator surface in facing relation to said film strip, said applicator surface including means for depositing said processing fluid on said film strip, support means for initially supporting said film at a given distance from said applicator surface, so as to provide a processing fluid coating of predetermined thickness on said given length of said film strip during advancement thereof, and means operative when said coating has been deposited on said given length of said film strip for increasing said given distance between said applicator surface and said support means to thereby allow subsequent free travel of said film strip therebetween, said increase of said given distance allowing deposit of an excess of processing fluid on said film strip, the improvement comprising:

absorption means carried by said film strip for absorbing said excess fluid deposited on said film strip when said spacing is increased, said absorption means comprising an absorbent pad mounted on said film strip with the leading end of said pad, as viewed with respect to film strip advancement during processing, inclined toward the surface of said film strip.

3. A photographic film strip configured for exposure and development within a photographic cassette, said cassette having means when driven for advancing said film strip within said cassette, a processing fluid applicator for depositing a controlled amount of processing fluid in a thin coating over a given length of said film strip during advancement thereof, a film discontinuity located near the trailing end of said given length as viewed with respect to advancement during processing for actuating said applicator to an inoperative state, said applicator being adapted to deposit an excess of fluid at said trailing end of said given length, the improvement comprising:

absorption means for absorbing said excess of fluid, said absorption means including an absorbent pad mounted on said film strip adjacent said discontinuity, wherein the leading end of said pad as viewed with respect to film strip advancement during processing is inclined toward said film strip.

* * * * *